United States Patent
Fwu et al.

(10) Patent No.: US 9,794,033 B2
(45) Date of Patent: Oct. 17, 2017

(54) SYSTEMS, METHODS AND DEVICES FOR OPPORTUNISTIC NETWORKING

(71) Applicant: Intel IP Corporation, Santa Clara, CA (US)

(72) Inventors: Jong-Kae Fwu, Sunnyvale, CA (US); Geng Wu, Plano, TX (US); Shafi Bashar, Santa Clara, CA (US); Hwan-Joon Kwon, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 282 days.

(21) Appl. No.: 14/580,735

(22) Filed: Dec. 23, 2014

(65) Prior Publication Data

US 2015/0264699 A1    Sep. 17, 2015

Related U.S. Application Data

(60) Provisional application No. 61/953,634, filed on Mar. 14, 2014.

(51) Int. Cl.
*H04W 72/12* (2009.01)
*H04L 5/00* (2006.01)

(52) U.S. Cl.
CPC ............ *H04L 5/003* (2013.01); *H04L 5/0001* (2013.01); *H04W 72/1215* (2013.01)

(58) Field of Classification Search
CPC ........... H04L 27/0006; H04L 27/2657; H04W 16/14; H04W 72/1215
See application file for complete search history.

(56) References Cited

U.S. PATENT DOCUMENTS

| | | | |
|---|---|---|---|
| 2012/0307869 A1 | 12/2012 | Charbit et al. | |
| 2013/0070790 A1* | 3/2013 | Vedantham | H04B 3/54 370/474 |
| 2013/0083783 A1 | 4/2013 | Gupta et al. | |
| 2013/0100948 A1* | 4/2013 | Irvine | H04J 3/0632 370/350 |
| 2013/0201884 A1 | 8/2013 | Freda et al. | |
| 2013/0242965 A1 | 9/2013 | Horn et al. | |

FOREIGN PATENT DOCUMENTS

WO    2013179095 A1    12/2013

OTHER PUBLICATIONS

Ericsson, "Collection of NCT decisions", RP-131790, 3GPP TSG RAN Meeting #62, Busan, Korea, Dec. 3-6, 2013, 11 pages.
PCT/US2015/015664, International Search Report and Written Opinion, May 26, 2015, 13 pages.

* cited by examiner

*Primary Examiner* — David Oveissi
(74) *Attorney, Agent, or Firm* — Stoel Rives LLP

(57) ABSTRACT

Opportunistic networking systems can utilize one or multiple bands/channels that are shared with other radio access technologies (RATs) (such as wireless local area networks (WLAN, such as Wi-Fi) and mmWave). An unconventional carrier type (UCT) can be defined to support opportunistic networking in licensed and/or unlicensed spectrum. For example, a primary base station can determine a secondary base station activated for use with user equipment (UE). The primary base station can schedule data to be sent to the UE via the secondary base station. The secondary base station can provide discovery information, reserve a wireless channel, transmit the data and/or release the channel (implicitly, explicitly, or by reservation).

25 Claims, 13 Drawing Sheets

SYSTEMS, METHODS AND DEVICES FOR OPPORTUNISTIC NETWORKING

RELATED APPLICATION

This application claims the benefit under 35 U.S.C. §119 (e) of U.S. Provisional Application No. 61/953,634 filed Mar. 14, 2014, entitled "OPPORTUNISTIC NETWORKING SUPPORT FOR LTE CELLULAR SYSTEM" which is incorporated by reference herein in its entirety.

TECHNICAL FIELD

The present disclosure relates to wireless transmission systems including systems for sharing wireless spectrum.

DETAILED DESCRIPTION OF PREFERRED EMBODIMENTS

Figure 1:
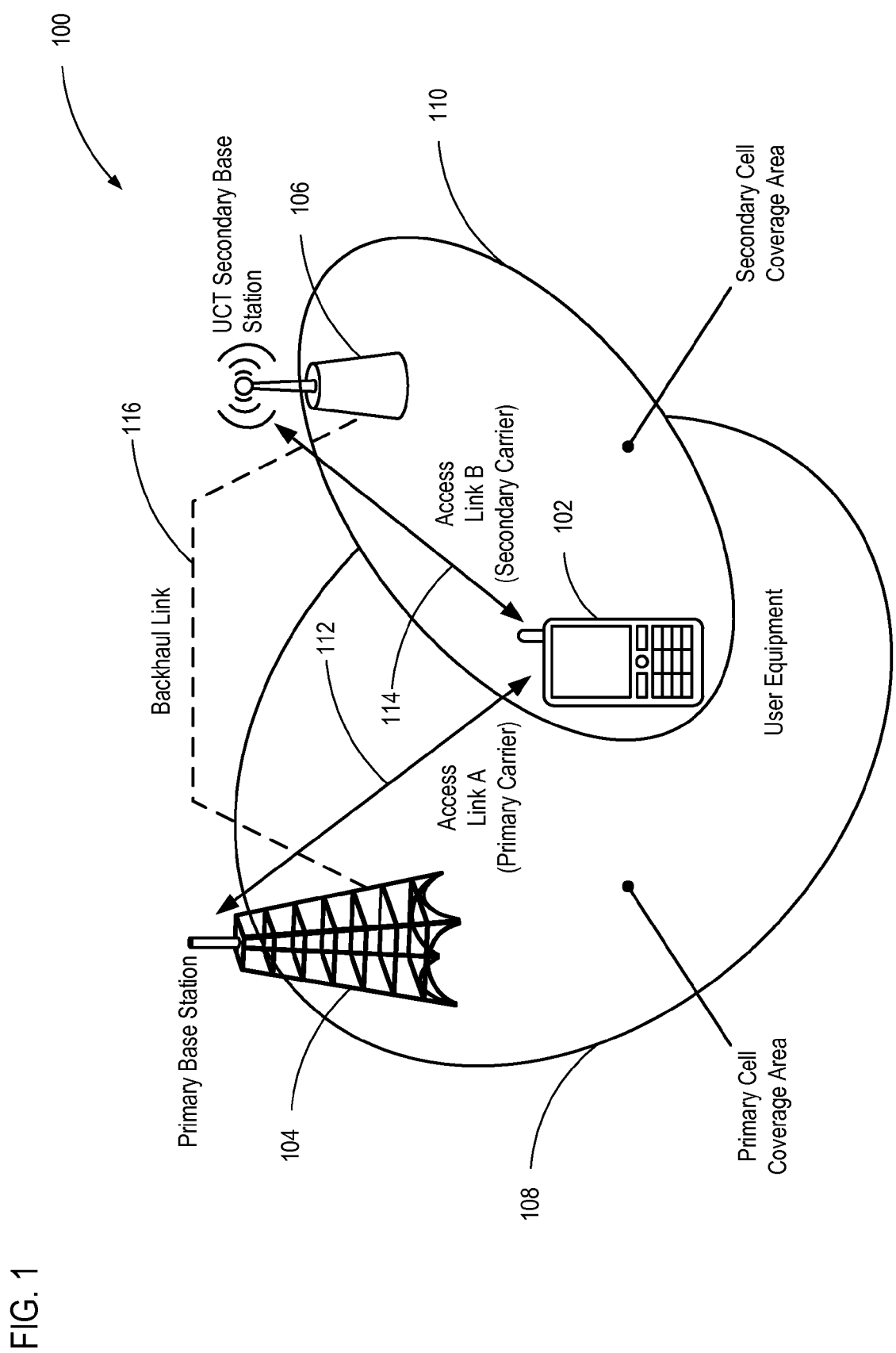
FIG. 1 is a diagram illustrating an opportunistic networking system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable opportunistic networking that utilizes one or multiple bands/channels that are used or shared with other radio access technologies (RATs) (such as wireless local area networks (WLAN, such as Wi-Fi) and millimeter wave (mmWave)). Conventional long term evolution (LTE) uses one or multiple frequency bands that are exclusively assigned to LTE (such as LTE carrier aggregation or New Carrier Type (NCT)). An unconventional carrier type (UCT) can be defined to support opportunistic networking in licensed and/or unlicensed spectrum. LTE in a licensed carrier will be referred to as LCT (licensed carrier type).

For example, a primary base station (which can provide a primary carrier and a primary cell (PCell), which can transmit over a primary medium, primary set of frequencies, primary spectrum, primary band, etc.) can determine a secondary base station (which can provide a secondary carrier and secondary cell (SCell), which can transmit over a secondary medium, secondary set of frequencies, secondary spectrum, secondary band, etc.) to activate for use with user equipment (UE). The primary base station can schedule data to be sent to the UE via the secondary base station. The secondary base station can provide discovery information, reserve a wireless channel, transmit the data and/or release the channel (implicitly, explicitly, or by reservation).

In one embodiment, fast cell switching is used to opportunistically use available spectrum. For example, mmWave technologies may have limited availability under unfavorable channel conditions (such as due to the high frequency effects). Very fast cell switching can allow opportunistic use of mmWave when available.

In another embodiment, more efficient sharing of a band of frequencies can be supported by fast switching between dormant (e.g., OFF) and active (e.g., ON) states. During dormant states, a UCT system will refrain from transmission to reduce interference to other RAT technologies using the spectrum. During active states, the UCT system can perform downlink (DL) and/or uplink (UL) LTE operations.

In one embodiment, dormant subframes can be used to perform protocols to aid in the sharing of the spectrum. For example, a UCT system can perform listen before talk (LBT) protocols and/or channel reservation techniques. Once the spectrum is reserved and/or available, the UCT can transition into an active state.

In another embodiment, a UCT system can reduce periodic transmission of signals compared with an LCT system. Instead of typical LCT signals, a discovery signal and/or synchronization signal can be used. The discovery signal can be sent periodically, even when a UCT system is in a dormant state (such as during a dormant subframe).

The demand for wireless broadband data in cellular networks is expected to increase. By considering user expectations of high data rates along with seamless mobility more spectrum can be made available for macro cells and small cells deployment. To support the growing demand of wireless broadband data, opportunistic use of additional available spectrum can be used. Such opportunistic network/offloading opportunity can be used in the following three scenarios to take advantage of the additional available spectrum in either the licensed or unlicensed band:

In scenario (1) the unlicensed spectrum can be used with LTE-A technology which is called LTE in Unlicensed (LTE-U) or Licensed Assisted Access (LAA). LTE-U can extend the LTE technology into unlicensed deployments, enabling operators and vendors to leverage existing or planned investments in LTE/evolved packet core (EPC) hardware in the radio and core network. LTE-U can also be considered a Supplemental Downlink Component Carrier (CC) in a LTE Carrier Aggregation (CA) configuration. The use of LTE in the unlicensed band can be in co-existence of LTE with other incumbent technologies deployed in the unlicensed band. Due to multiple LTE operators using the same unlicensed spectrum, self-coexistence among different LTE operators in the same band can also be encountered.

In scenario (2) an opportunistic networking embodiment uses the LTE licensed band together with another Radio Access Technology (RAT) used in high frequency spectrum, such as millimeter wave (mmWave). The option to opportunistically use the mmWave channel cannot always be guaranteed, due to the potentially high path-loss and restrictive beam forming requirements to achieve reasonable link/channel quality. A design than includes support opportunistic networking and use of mmWave (when channel condition is favorable) can be beneficial to ensure the basic quality of service (QoS), which can improve user experience. Cell densification can trigger interest in applying the mmWave spectrum at densely populated areas in order to provide local coverage without causing excessive inter-cell interference. Use of a highly directional antenna array and beam forming with mmWave communication can provide additional coverage and capacity improvements. In some embodiments, the mmWave bands can be regarded as an additional secondary carrier and SCell in order to improve the existing LTE system performance.

In scenario (3) Device-to-Device (D2D) service can be used in unlicensed spectrum together with the conventional LTE service in licensed spectrum. The D2D service in unlicensed spectrum can be used to opportunistically off-load the traffic demand in licensed band LTE service and improve the overall data rate and user experience.

The use of additional spectrum in the above examples can lead to the coexistence of frequency bands with different propagation characteristics within the same system. A framework can be built on the concept of an unconventional carrier type (UCT) concept together with the operation of quickly turning the cell on/off to support opportunistic networking options and address coexistence. Several concepts can be used in the design of opportunistic networking, including: (A) utilize a concept of licensed-assisted (LTE assisted) spectrum sharing scheme; (B) utilize a carrier aggregation concept and (C) utilize a fast cell on/off mechanism to support opportunistic use of spectrum and networking.

These opportunistic networking concepts will be further explored in the description of the unconventional carrier type design heading. However, an introduction to a system that can use opportunistic networking is first described to aid in the comprehension of the design.

Wireless mobile communication technology uses various standards and protocols to transmit data between a base station and a wireless mobile device. Wireless communication system standards and protocols can include the 3rd Generation Partnership Project (3GPP) long term evolution (LTE) standard; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. Mobile broadband networks can include various high speed data technologies, such as 3GPP LTE systems. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Turning to FIG. 1, an example of a portion of a radio access network (RAN) system 100 includes a single cellular air interface (such as an LTE/LTE-Advanced access link) being provided between an primary base station 104 and a UE 102 (i.e., on Access Link A), and an air interface (a supplemental network interface such as a LTE-U based interface) being provided between a secondary base station 106 and the UE 102 (i.e., on Access Link B). The UE 102 is located within a macro cell coverage 108. The UE 102 determines that connection with the secondary base station 106 will be beneficial to a user of the UE 102. In some embodiments, the UE 102 retains Access Link A to the primary base station 104. The UE 102 can offload some or part of wireless services onto Access Link A. In other embodiments, the UE 102 disconnects from Access Link A and moves all wireless services to Access Link B. In some embodiments, Access Link A and Access Link B use the same frequency and technology. In other embodiments, Access Link A and Access Link B use different frequencies (e.g., LTE licensed frequencies and unlicensed frequencies) and different link technology (e.g., LTE and Wi-Fi). In other embodiments, Access Link A and Access Link B use different frequencies and similar link technology (e.g., LTE and LTE over mmWave).

Figure 2:
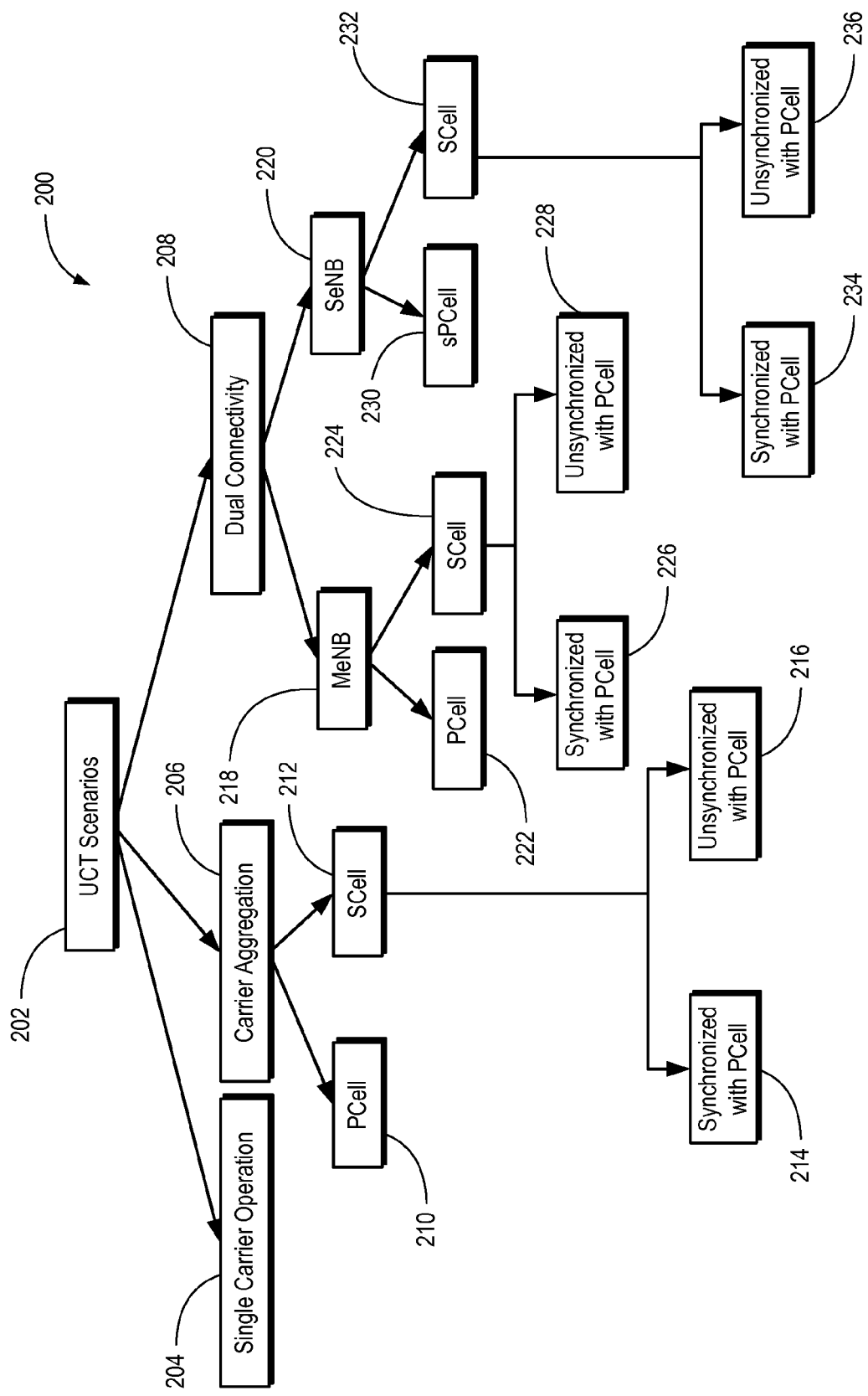
FIG. 2 is a block diagram illustrating use cases of an opportunistic networking system consistent with embodiments disclosed herein.

FIG. 2 presents a chart 200 of different application scenarios 202 for UCT. A UCT carrier design provides a general framework to enable LTE to be deployed in scenarios where existing LTE/LTE-A may not be suitable, while still meeting the above target requirements. Although an enhancement for unlicensed band deployment is an advantage for UCT, the UCT can be used in the licensed band as well. It can be used as DL supplementary secondary carrier (DSC) or supporting both DL and UL. It can be supported in both frequency division duplexing (FDD) and time division duplexing (TDD) modes.

When used in a single carrier operation 204, the UCT can operate as a stand-alone carrier either in a licensed or an unlicensed band (e.g., as primary carrier).

An application of UCT can be (1) as a secondary carrier providing an SCell 212 on an unlicensed band in a carrier aggregation (CA) 206 scenario, or (2) as a secondary carrier providing an SCell 224 in a Master eNB (MeNB) group 218, or as a secondary carrier providing an SCell 232 in an SeNB group 220 in case of dual connectivity (DC) 208 scenarios. In some embodiments of CA 206 (see also long term evolution release 12 specification (LTE Rel-12)), the secondary carrier providing an SCell 212 is assumed to be synchronized with a primary cell providing a PCell 210. However, due to the use of UCT in the unlicensed band, additional CA 206 scenarios where the secondary carrier providing SCell 212 is not synchronized with the primary cell providing PCell 210 can be described in future LTE releases (LTE Rel-13 and beyond). In addition, UCT can also act as an supplementary primary carrier providing an sPCell 230 in an SeNB group 220 in the DC 208.

The use of UCT as the primary carrier providing a PCell 210 in the CA 206 scenario and/or as the primary carrier providing a PCell 222 in the MeNB group 218 in case of the dual connectivity 208 is also possible.

Figure 3:
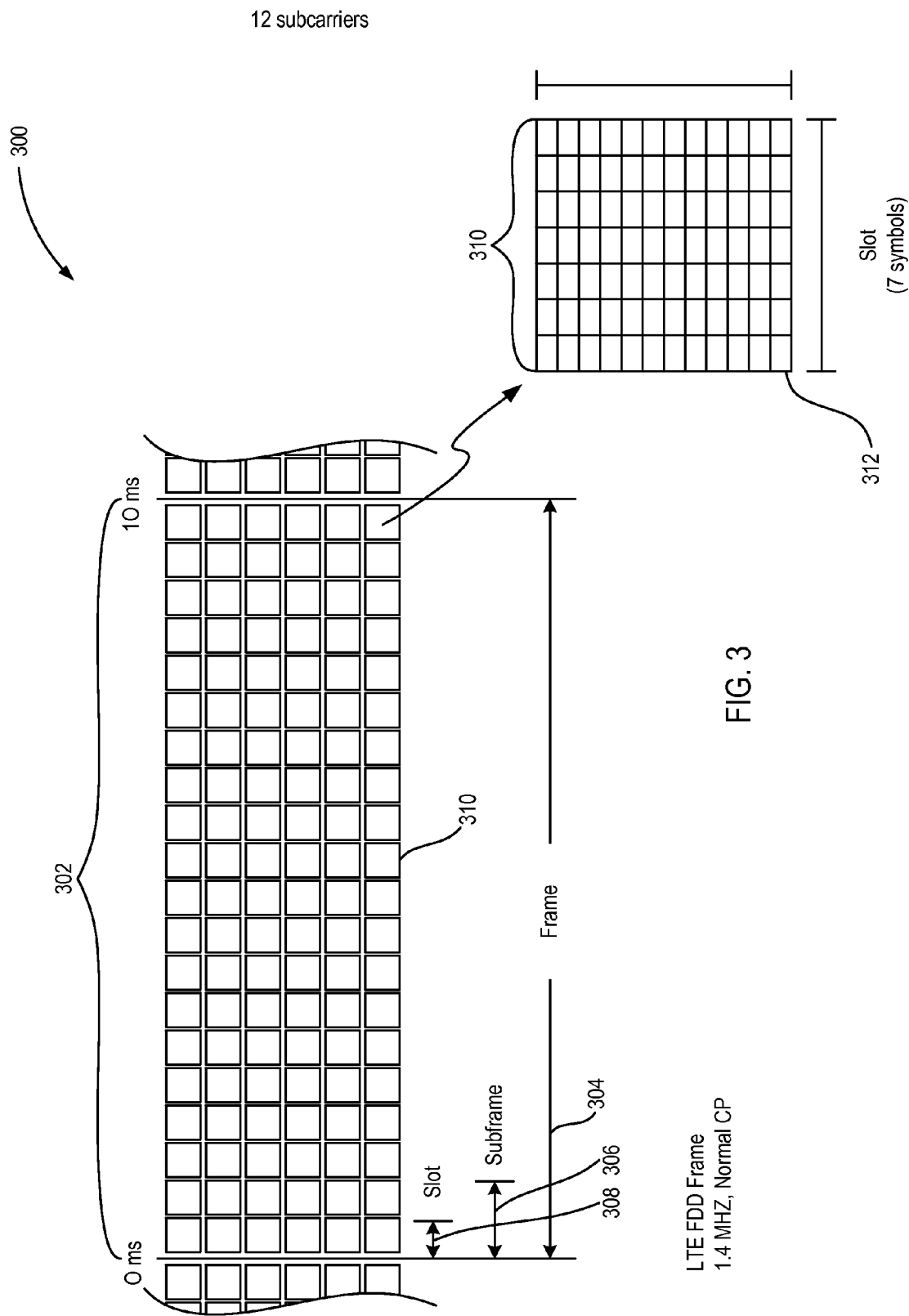
FIG. 3 is a diagram of a long term evolution (LTE) frame consistent with embodiments disclosed herein.

FIG. 3 is a schematic diagram 300 illustrating a long term evolution (LTE) communication frame 304 of a 10 ms duration 302. In one embodiment, each frequency allocation (carrier) can be in 108 kHz increments. In the diagram shown, a minimum of six carriers are shown. This allows for a bandwidth of 1.08 MHz (six carriers times 180 kHz=1.08 MHz bandwidth). In some embodiments, the carriers can be expanded to 110 blocks (110 carriers times 180 kHz=19.8 MHz). The frame 304 can be 10 ms with each slot 308 being 0.5 ms (and each subframe 306 being 1 ms).

The slot 308 at a carrier is a resource block 310, which includes seven symbols at 12 orthogonal frequency-division multiplexing (OFDM) subcarriers. A resource element 312 is one OFDM subcarrier for the duration of one OFDM symbol. The resource block 310 can include 84 resource elements 312 when using a normal cyclic prefix (CP). OFDM spacing between individual subcarriers in LTE can be 15 kHz. A guard period of a CP can be used in the time domain to help prevent multipath inter-symbol interference (ISI) between subcarriers. The CP can be a guard period before each OFDM symbol in each subcarrier to prevent ISI (such as due to multipath).

Figure 4:
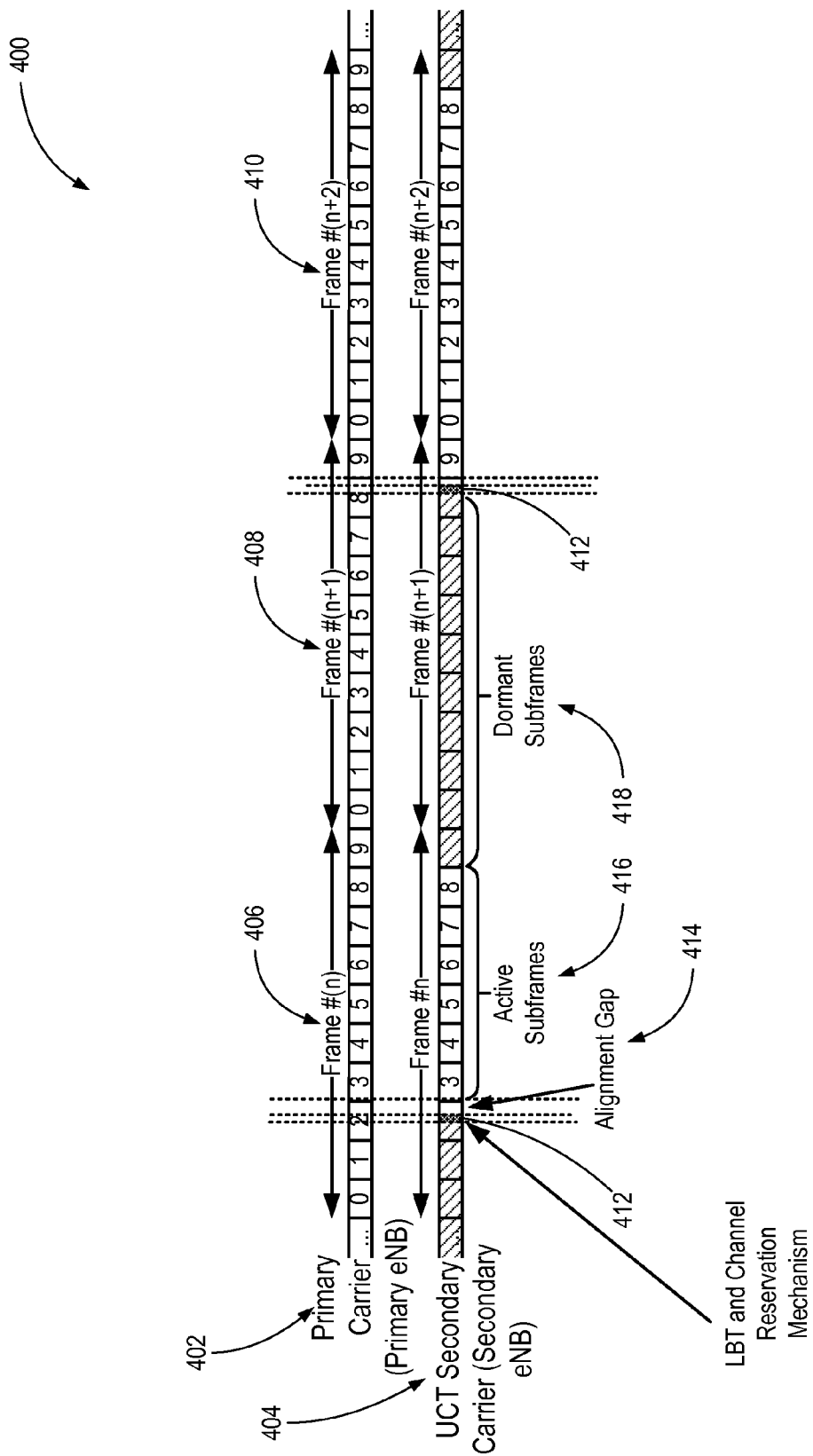
FIG. 4 is a diagram illustrating use of an alignment gap to synchronize transmissions consistent with embodiments disclosed herein.
Figure 5:
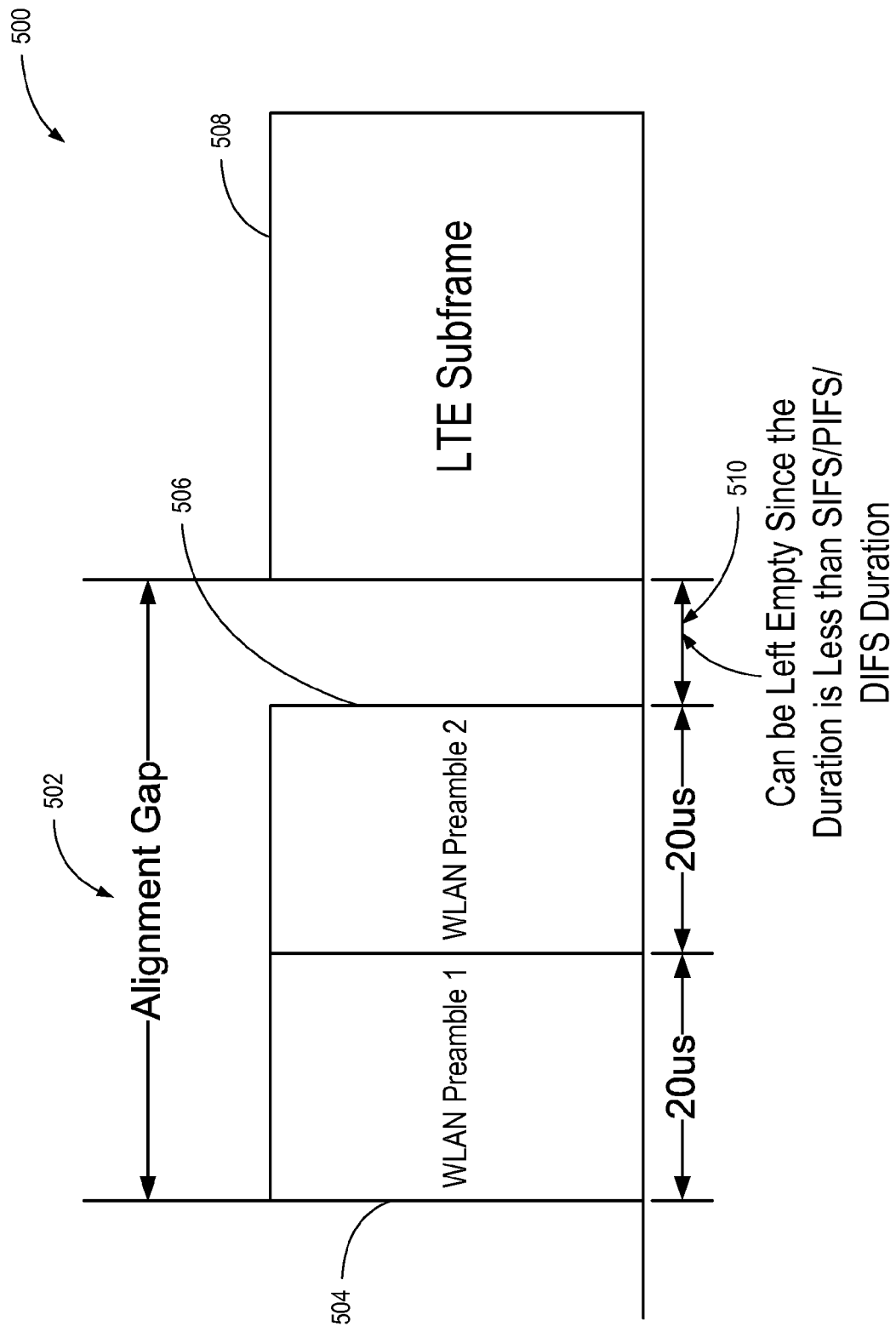
FIG. 5 is a diagram illustrating use of a preamble within an alignment gap to synchronize transmissions consistent with embodiments disclosed herein.
Figure 6:
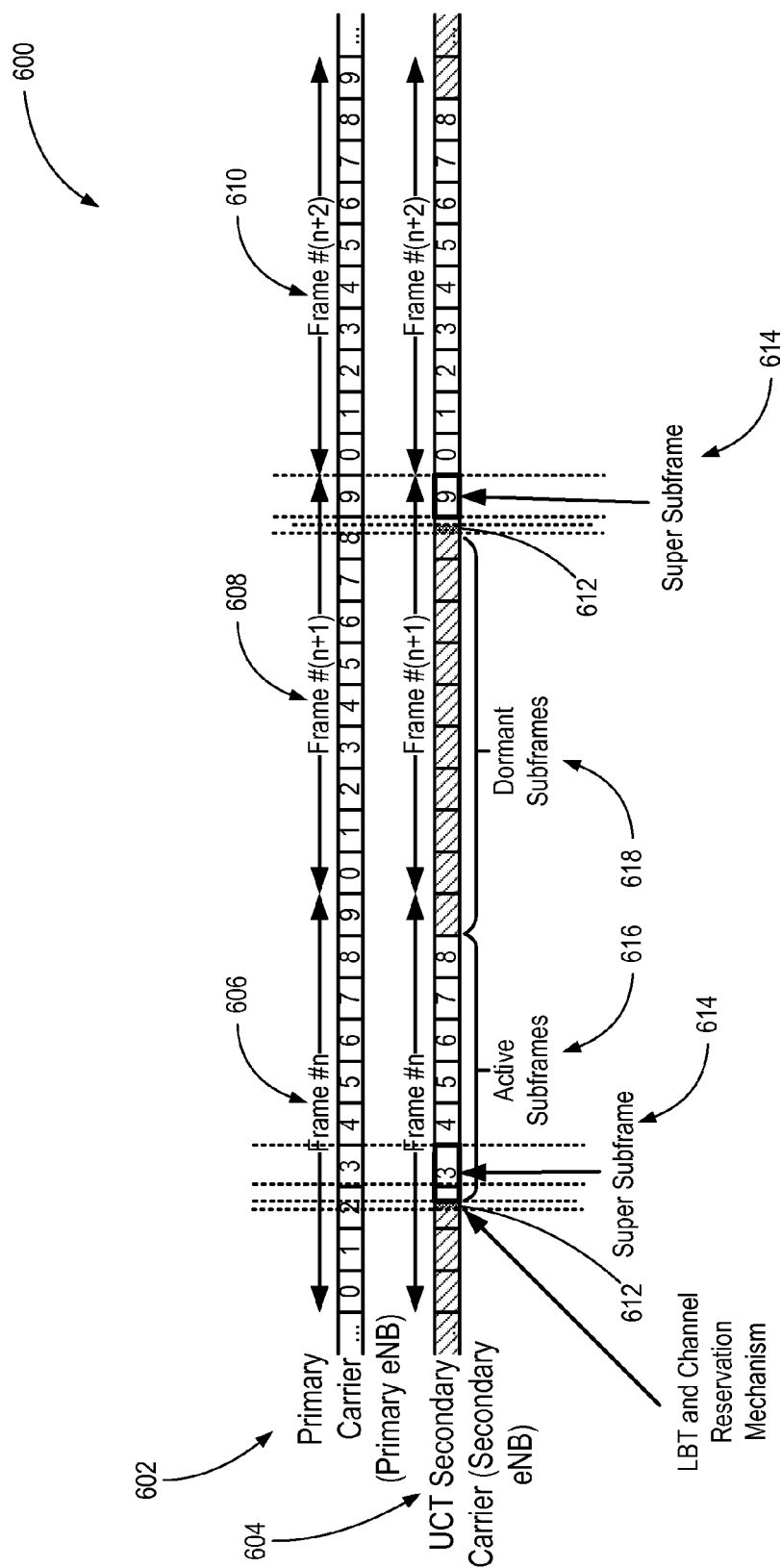
FIG. 6 is a diagram illustrating use of a super subframe to synchronize transmissions consistent with embodiments disclosed herein.
Figure 7:
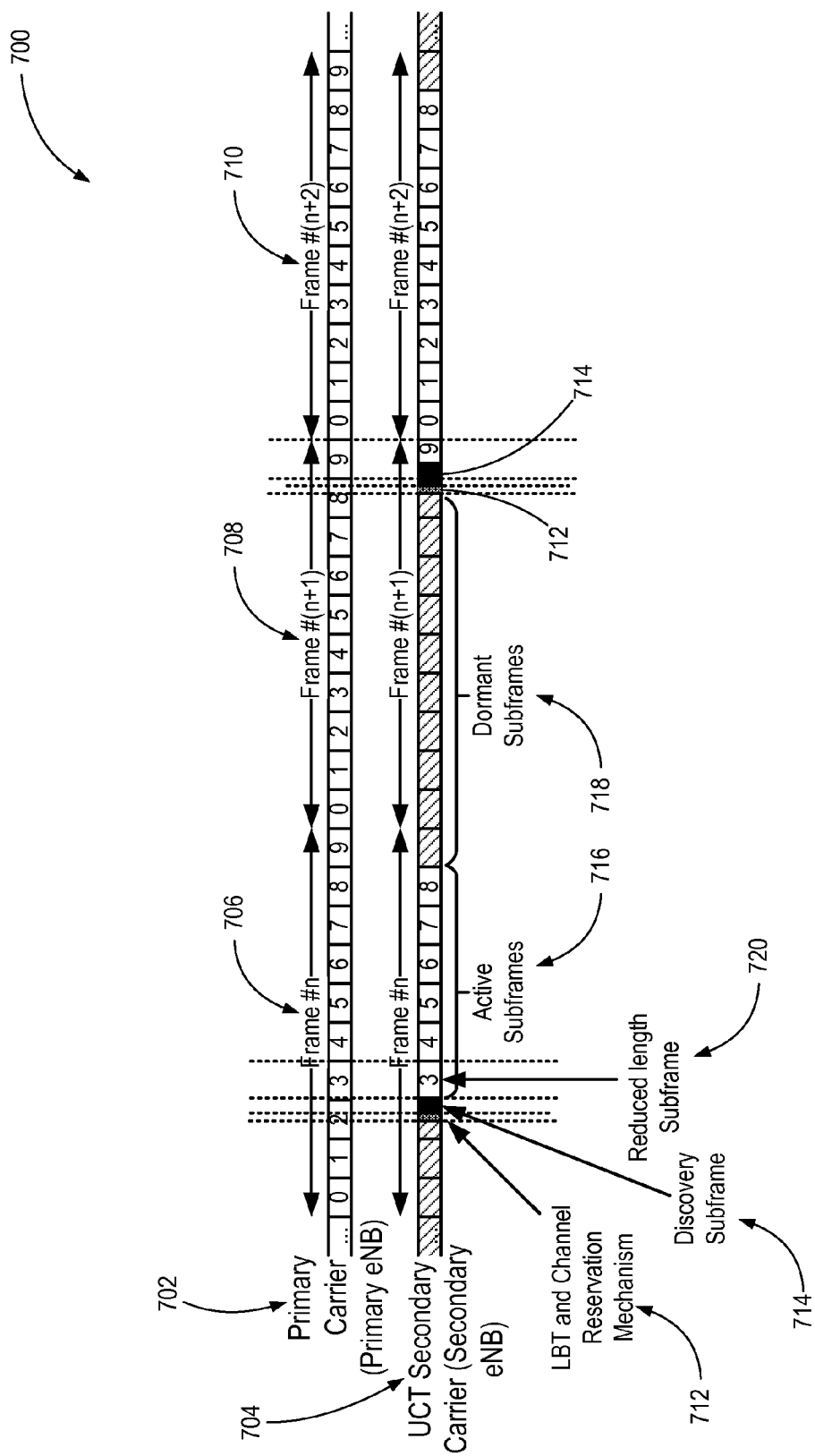
FIG. 7 is a diagram illustrating use of a reduced length subframe to synchronize transmissions consistent with embodiments disclosed herein.
Figure 8:
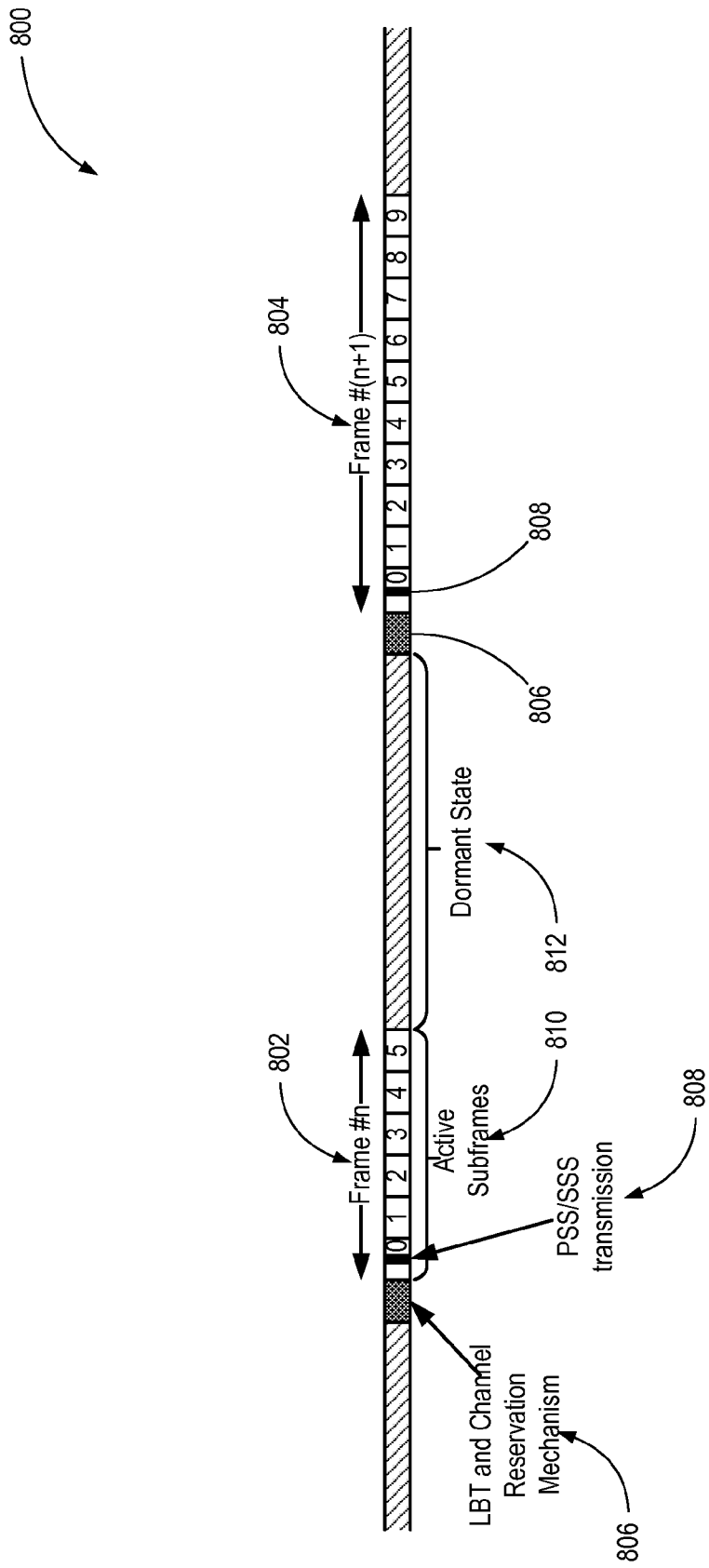
FIG. 8 is a diagram illustrating use of primary synchronization signals and/or secondary synchronization signals (PSS/SSS) consistent with embodiments disclosed herein.
Figure 9:
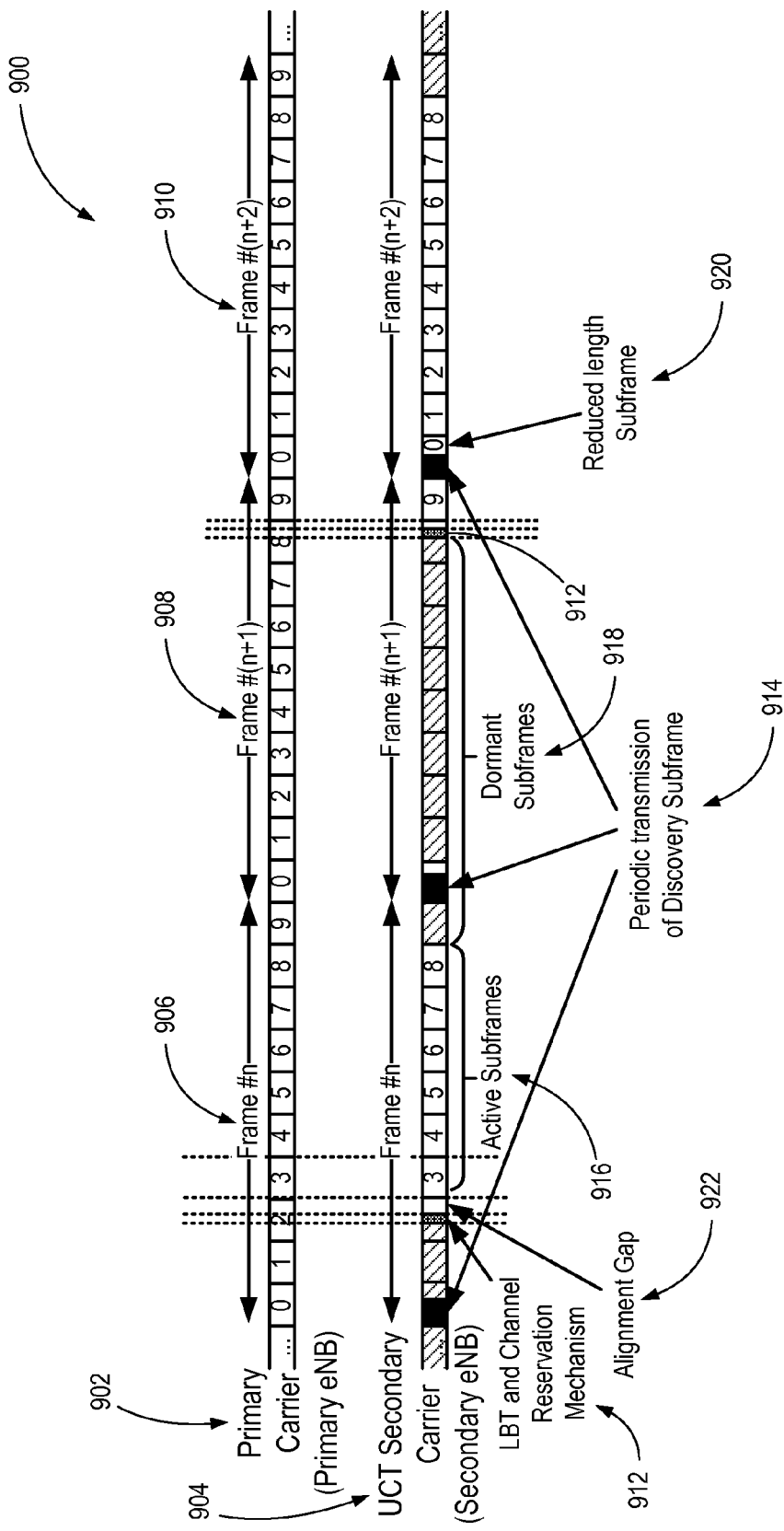
FIG. 9 is a diagram illustrating use of periodic transmission of discovery subframes consistent with embodiments disclosed herein.
Figure 10:
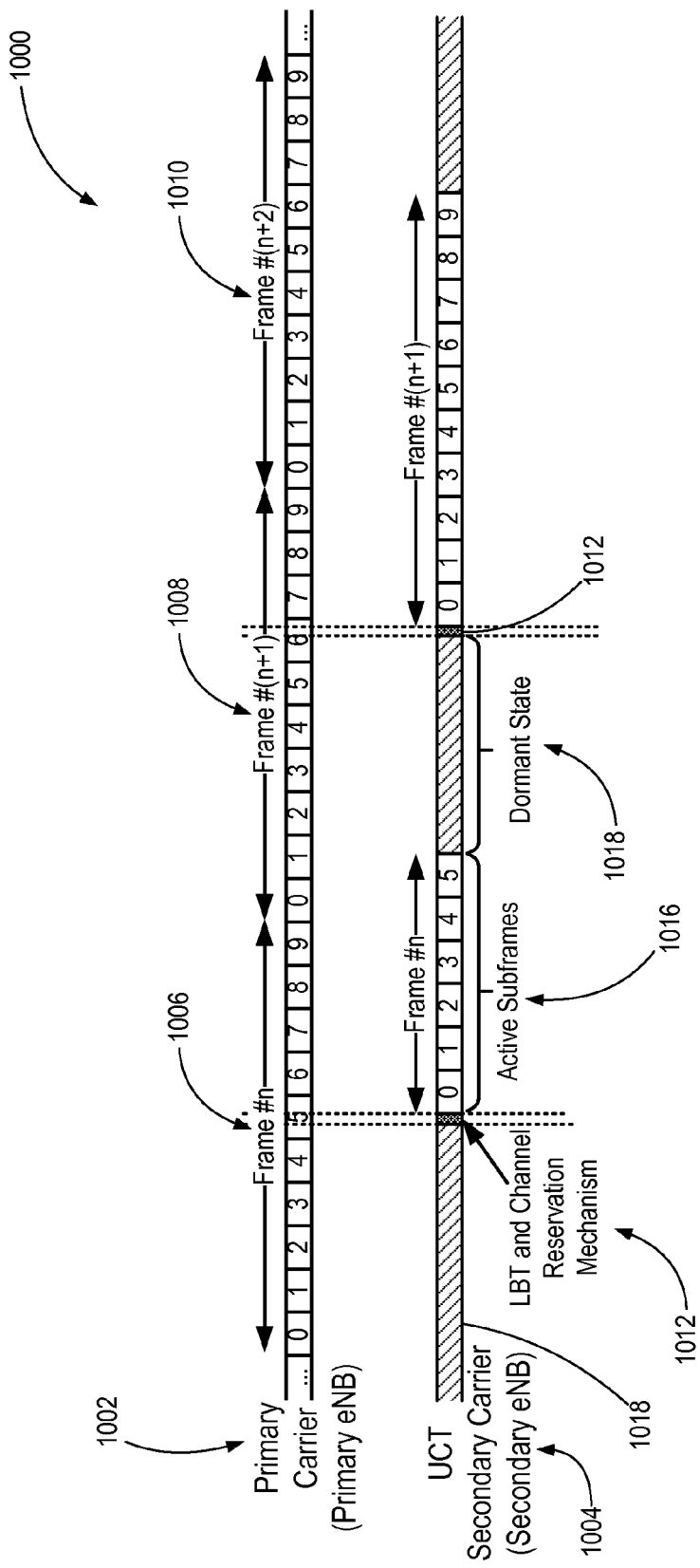
FIG. 10 is a diagram illustrating unaligned subframes with channel reservation consistent with embodiments disclosed herein.
Figure 11:
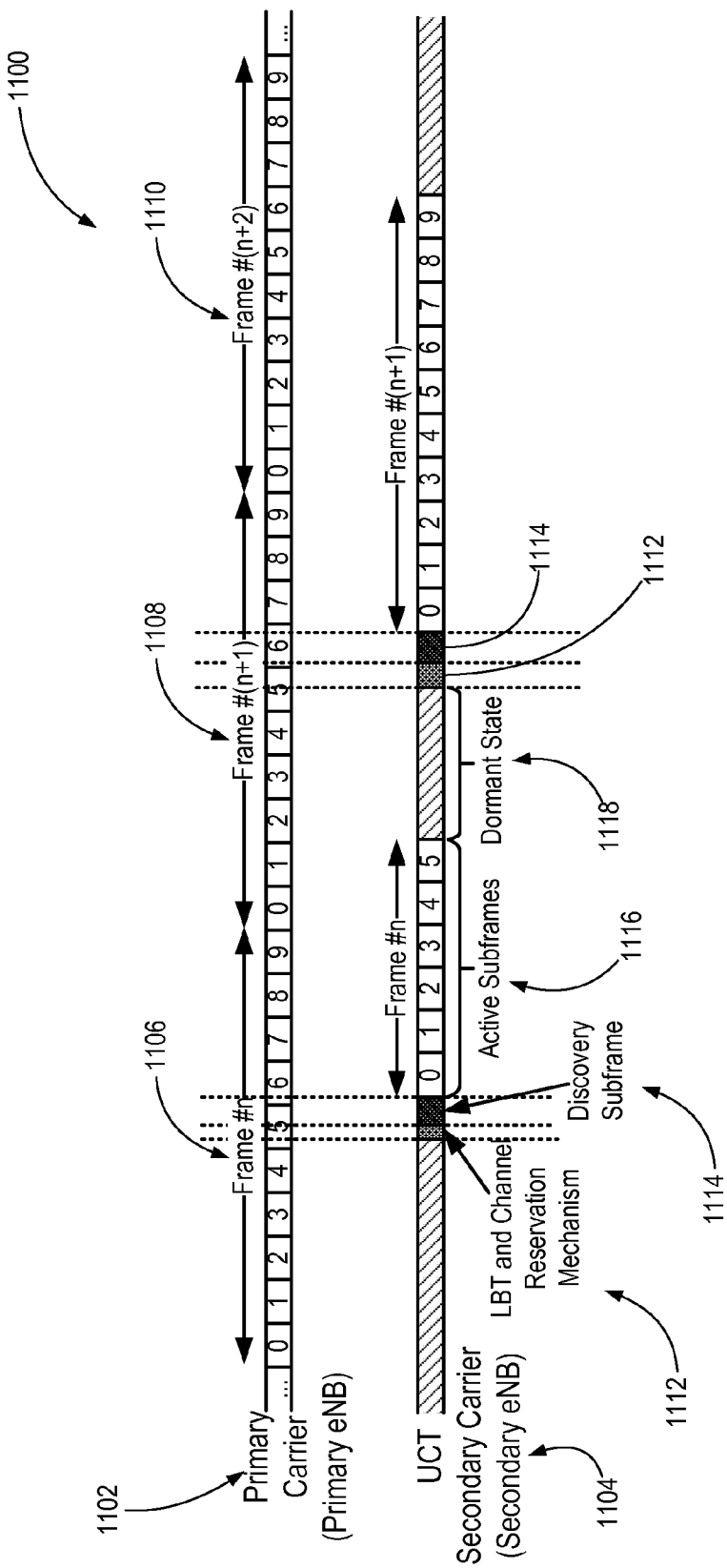
FIG. 11 is a diagram illustrating unaligned subframes with channel reservation and a discovery subframe consistent with embodiments disclosed herein.

LTE frames can be altered for use with a UCT framework. FIGS. 4-11 show various embodiments in which an LTE frame is used with a UCT framework. FIG. 4 shows an alignment gap for synchronization with a primary carrier. FIG. 5 shows channel reservation in conjunction with a UCT. FIG. 6 shows an extended subframe or super subframe used in synchronization. FIG. 7 shows a reduced length subframe for use with synchronization. FIG. 8 shows an example of an unsynchronized frame with PSS/SSS transmissions. FIG. 9 shows an example of a synchronized frame that uses periodic transmission of discovery subframes and channel reservation. FIG. 10 shows an unsynchronized subframe with channel reservation. FIG. 11 shows an unsynchronized subframe with channel reservation and discovery subframes. These Figures will be described in conjunction with UCT design including UCT types and variations.

Unconventional Carrier Type (UCT) Design

Opportunistic networking utilizes one or multiple bands/ channels that are used or shared with other radio access technologies (RATs) such as WLAN and mmWave, while the conventional LTE (or simply referred to as LTE) uses one or multiple frequency bands that are exclusively assigned to LTE (such as LTE carrier aggregation or New Carrier Type (NCT). An unconventional carrier type can support opportunistic networking in licensed and/or unlicensed spectrum. In this description, such carrier is referred to as an unconventional carrier type (UCT), while referring to LTE in a licensed carrier as LCT (licensed carrier type).

In some embodiments, design objectives of UCT can include: (1) opportunistic use of additional available spectrum using LTE and other RATs (e.g., WLAN, mmWave, etc.) (this can be considered as a spectrum sharing mechanism in conjunction with the use of LTE technology, e.g., a licensed-assisted (LTE assisted) spectrum sharing scheme); (2) efficient sharing of spectrum with other incumbent RATs in the additional spectrum; (3) conforming to regulatory restrictions of additional available spectrum for the licensed or unlicensed band; and (4) lower interference to other RATs or LTE in the same or an adjacent band.

Objective 1: Opportunistic Use of Additional Available Spectrum Using LTE and Other RATs Such as WLAN, mmWave, Etc.

Some challenges for RATs used in the high frequency band (e.g., mmWave communications) include large path loss (especially for non-line-of-sight scenarios) and, signal blocking/absorption by various objects in the environment. Advanced antenna arrays with smart beam selection/tracking algorithms can be used to address the signal attenuation or path-loss issue. This can lead to a limited availability under unfavorable channel condition on the high frequency (e.g., mmWave) band. Therefore, very fast cell switching or fast opportunistic use of the mmWave channel can be used in leverage of the additional mmWave resource.

Objective 2: Efficient Sharing of Spectrum with Other RATs in the Additional Spectrum Some embodiments aid efficient sharing of the unlicensed band through the operation by fast switching of the UCT on the unlicensed band between two states: Dormant (or OFF) and active (or ON). The UCT subframes during the dormant state can be referred to as dormant (OFF) subframes, whereas the UCT subframes during the active state can be referred to as active (ON) subframes. UCT activities during the dormant and active states can be categorized into two separate tasks: design of active subframes and design of dormant subframes.

During the active state/subframes, the UCT may perform DL and/or UL LTE operations, whereas during the dormant subframe, the UCT will refrain from transmission so as to reduce interference, thus enabling the use of the unlicensed band for other incumbent RATs. Therefore, the active state/ subframe and the dormant state/subframe can be regarded as the ON state/subframe and the OFF state/subframe, respectively.

In one embodiment and when there is no LTE traffic, the UCT can be in a dormant state, where all subframes are dormant subframes. While the state is labeled as OFF or dormant, some signaling or control channels can be transmitted on the UCT secondary carrier for special purposes (such as synchronization, signal strength/quality measurements, etc.) during this state. These subframes conveying these signal/channels are still referred to as OFF subframes (or OFF state) since there are no data (traffic) transmissions (e.g., physical downlink shared channel (PDSCHs)) in these subframes.

Objective 3: Conforming to the Regulatory Restrictions of the Additional Available Spectrum for the Licensed or Unlicensed Band In order to follow restrictions (such as regulatory restrictions) of the unlicensed band, the OFF/dormant subframes can be used to perform protocols such as listen before transmit (LBT) to scan if the wireless medium (also known as wireless spectrum, wireless frequencies, channel, etc.) is busy or idle. Additionally, the UCT can also reserve the medium from other RATs (such as by performing a spoofing mechanism to reserve the channel for its own transmission). Once the medium is reserved (or sensed idle in case the reservation is not required depending on the LBT protocol), the UCT can transition from the OFF/dormant state to the ON/active state, and the active subframe is used for transmitting data (e.g., PDSCH).

Objective 4: Lower Interference to Other Radio Access Technologies (RAT) or LTE in the Same or Adjacent Band In some embodiments and in order to aid in minimizing transmission overhead and in reducing interference, the UCT design can minimize the periodic transmission of signals normally transmitted in LCT. For example and in DL LCT design, the following signals are transmitted periodically in frequency division duplex (FDD) and time division duplex (TDD).

In some embodiments of FDD DL, several signals are transmitted periodically. Cell-specific reference signal (CRS) is transmitted in every subframe, except the physical downlink shared channel (PDSCH) portion of the multicast-broadcast single-frequency network (MBSFN) subframe. PSS and SSS are transmitted in subframes 0 and 5. Physical broadcast channel (PBCH) is transmitted in subframe 0. SIB-1 is transmitted in subframe 5 on the systems frame number (SFN) satisfying the condition, SFN mod 2=0 (i.e., every other frame). Paging in subframes 0, 4, 5 and 9 on frame satisfy the equation SFN mod T, where T is the discontinuous reception (DRX) cycle of the UE.

In some embodiments of TDD DL, several signals are transmitted periodically. CRS is transmitted in every downlink subframe, except the PDSCH portion of the MBSFN subframe. PSS are transmitted in subframes 0 and 5. SSS are transmitted in subframes 1 and 6. PBCH is transmitted in subframe 0. SIB-1 is transmitted in subframe 5 on the SFN satisfying the condition, SFN mod 2=0 (i.e., every other frame). Paging in subframes 0, 1, 5 and 6 on frame satisfy the equation SFN mod T, where T is the DRX cycle of the UE.

In addition, CRS transmissions can be reduced. CRS transmission provides reference signal received power/reference signal received quality (RSRP/RSRQ) measurement, fine-frequency tracking and channel estimation. However, CRS transmission on empty subframes (e.g., in the OFF/dormant subframe) can cause interference with other RATs and/or LTE-U systems using the spectrum. If a CRS transmission power exceeds a certain threshold, the incumbent WLAN network can sense the medium as busy and refrain from transmission. Reducing or removing the transmission of CRS on UCT can improve the efficiency of medium use by other RATs.

Reduced transmission of CRS can be achieved in several possible ways. In a first embodiment, CRS transmission can be limited to active subframes. In dormant subframes, UCT can refrain from CRS transmission. In a second embodiment, CRS is eliminated from both active and dormant subframes. Alternative signals (such as channel state information reference signal (CSI-RS), demodulation reference signal (DM-RS), etc.) can be used to perform these tasks of CRS, making CRS transmission potentially redundant. In a third embodiment, a cell on/off mechanism can be introduced, whereby UCT will be switched off when not transmitting data and turned on when there is data available to be transmitted.

In some embodiments, transmission frames can be synchronized. In some embodiments of LCT, PSS/SSS is used for initial coarse time and frequency synchronization. In addition, PSS/SSS can also be used for cell selection purposes during initial access. Similar to transmission of CRS, periodic transmission of PSS/SSS can introduce additional interference to the other RATs/LTE network in the unlicensed band. In an embodiment, whether PSS/SSS transmission is provided on UCT depends on the geographical location and the spectrum location of a UCT secondary base station with respect to a licensed primary base station. If both the primary base station and secondary base station are co-located and the secondary base station band is adjacent to the primary base station (i.e., inter-band CA), then the PSS/SSS transmitted on the primary base station can be used for secondary base station synchronization. PSS/SSS transmission may be considered redundant on the secondary base station. In a second example where the secondary base station is not co-located with the primary base station, or in case of intra-band CA, primary base station synchronization may not be as effective when re-used for UCT secondary base station synchronization purposes.

Several different design embodiments can be considered for the transmission of such PSS/SSS signals. In a first embodiment, PSS/SSS transmission can be eliminated on the UCT secondary base station in case of co-located inter-band CA as described above.

In a second embodiment, PSS/SSS can follow transmission timing as in an LCT primary carrier (e.g., in case of FDD, PSS and SSS can be transmitted in subframes 0 and 5 in a frame). Actual transmission can be limited to when the subframes 0 and 5 are active subframes. In case of a dormant subframe, no PSS/SSS transmission will occur.

In a third embodiment, transmission of PSS/SSS can follow new timing, different from an LCT primary carrier. For example, transmission of PSS/SSS can take place on a k-th active subframe in a frame on UCT (i.e., every k active subframe).

In a fourth embodiment and instead of transmitting legacy PSS/SSS for synchronization purposes, a new synchronization or discovery signal can be used. In addition, a new subframe structure can be designed to be used for transmitting only discovery signals (such as subframes that include the discovery signal, which are called discovery subframes). A discovery signal can be transmitted during the OFF state, and the discovery signal may be used for cell identification, radio resource management (RRM) measurements and other purposes.

In some embodiments, transmission of PBCH/paging and other system information can be eliminated from a UCT secondary base station. Such information can be carried out on licensed primary base station carriers. In case of stand-alone applications of a UCT, however, such discovery signal may still be necessary. If a stand-alone UCT is operated on an unlicensed band, then the legacy schemes may not be readily applicable. Similar to the PSS/SSS mechanisms as described above, new timing can be defined for transmission of such signal on a UCT.

Using the description above, embodiments of a UCT system are described below.

Type 1 UCT

In FIG. 4, an example of a type 1 UCT is shown. In this example, the subframe/frame boundary of a UCT secondary eNB 404 is aligned with the subframe/frame boundary of a legacy primary eNB 402. In this example, in the OFF/dormant subframes 418, the UCT secondary eNB 404 refrains from transmission. Before the transition/switch to an active state, the UCT secondary eNB 404 may perform LBT that can include a channel reservation mechanism with timing 412. Once the UCT secondary eNB 404 reserves the medium or senses the channel idle, the UCT secondary eNB 404 can transmit data in active subframes 416, i.e., transition to the ON/active state. In order to maintain alignment with the primary carrier 402 subframes (406, 408 and 410), a portion of active states right before the first active subframe is left unused. This gap is referred to as an alignment gap 414.

In some embodiments and during the alignment gap 414, if no signal is transmitted by LAA eNB or UE, then other incumbent RATs (e.g., WLAN) as well as other LAA operators may determine the medium is empty due to lack of transmission. The incumbent RATs or LAA operators may attempt to transmit during an empty medium. To keep the medium reserved for transmission in the first active subframe, the LAA eNB or UE can transmit a signal to keep the medium occupied until the first subframe. Several mechanisms can be used to address this issue of medium reservation.

In FIG. 5, a chart 500 shows a mechanism for channel reservation that can be used during an alignment gap 502. A signal (shown here as WLAN preambles 504 and 506) can be transmitted during the alignment gap 502 to keep the medium busy before transmission of a subframe 508. In the embodiment shown in FIG. 5, the signals transmitted are the 802.11 a preamble signals consisting of 8 us long STF (short training field), 8us LTF (long training field) and 4 us long signal field, a total duration of 20 us. Multiple copies of the signal can be transmitted during an alignment gap to keep the medium occupied. Other alternative signals can also be considered. In different embodiments, the signal can take the form of a noise signal (e.g. white noise, pseudo-random sequence etc.), empty (if less than a duration of time), a reservation message and/or a discovery signal. In a first example embodiment, a form of a noise signal (such as pseudo-random noise sequence) can be broadcast throughout the entire transmission bandwidth. In a second embodiment and if the alignment gap is less than a certain duration, then the alignment gap can be left empty 510. A WLAN access point/station (AP/STA) can wait/scan a duration of at least short interframe space (SIFS), packet coordination function (PCF) interframe space (PIFS) or distributed coordination function (DCF) interframe space (DIFS) before transmitting acknowledge (ACK) info, beacon and data frame respectively. If the alignment gap is less than one of these values (e.g., less than SIFS) then the alignment gap can be left empty.

In a third example, the secondary base station can transmit some form of a signal that is understood by WLAN (e.g., physical(PHY) layer spoofing signal based on WLAN preambles 504 and 506, RTS message or CTS message, etc.). In FIG. 5, one example of transmitting WLAN preambles 504 and 506 is shown. In the embodiment shown an alignment gap is 50 microseconds (us). An LTE symbol duration without CP is 66.7 us, which is larger than the alignment gap of 50 us. Instead, transmission of the short training field (STF), long training field (LTF) and signal field (SIG) are part of a WLAN preamble that causes WLAN devices to see the medium as busy. As an added benefit, a WLAN AP/STA can decode the SIG portion of the signal and update their network allocation vector (NAV) for the duration specified in the preambles 504 and 506. One or more copies of a reservation message can be transmitted. Since a WLAN AP/STA wait/scans a duration of at least SIFS, PIFS or DIFS before transmitting ACK info, beacon and data frame respectively, if the remaining alignment gap 510 after transmitting one or more such preambles 504 and 506 is less than that the duration, then the additional gap 510 can be left empty. In some embodiments, a clear to send (CTS) message, request to send (RTS) message or RTS-CTS message can also be used in place of the preamble(s) 504 and 506.

In a fourth example and if the duration is more than a LTE symbol length, then an LTE discovery signal can be transmitted. Depending on the duration, one or more symbols of an LTE signal can be transmitted. Some example of discovery signals include PSS/SSS, one or several symbols of CRS, CSI-RS, SRS, DMRS, PRS, etc. or an enhanced version of these signals.

This alignment gap can be larger than one subframe. During the gap, UE scheduling (including the selection of the target UE, modulation and coding scheme (MCS), resource block (RB) allocation, etc.) and encoding (e.g., PDSCHs) can be performed at the eNB.

In FIG. 6, a second mechanism 600 is shown, which can be used for channel reservation. A primary eNB 602 transmits data over frames 606, 608 and 610. A UCT secondary eNB 604 is scheduled to transmit data during active subframes 616 and to transition to a dormant state during dormant subframes 618. To synchronize transmission of the primary eNB 602 and secondary eNB 604, a LBT protocol and/or reservation mechanism 612 can be used to reserve the channel. An alignment gap after the mechanism 612 is merged with a first active subframe to create a super-subframe 614. Alternatively, the alignment gap can be used to transmit discovery signals as mentioned above.

In another embodiment shown in FIG. 7, a discovery subframe 714 is transmitted after a channel reservation 712 is performed. As described earlier, the discovery subframe 714 can contain signals for synchronization and RSRP measurement. To accommodate the discovery subframe 714, a first active subframe immediately following the discovery subframe 714 can be shortened to a reduced length subframe 720. For example, a primary eNB 702 transmits data over frames 706, 708 and 710. A UCT secondary eNB 704 is scheduled to transmit data during active subframes 716 and to transition to a dormant state during dormant subframes 718. To synchronize transmission of the primary eNB 702 and secondary eNB 704, a LBT protocol and/or reservation mechanism 712 can be used to reserve the channel. A discovery subframe 714 is transmitted after the LBT/reservation mechanism 712. A first active subframe is shortened to create the reduced length subframe 720.

In FIG. 8, a legacy PSS/SSS 808 can be used as a discovery signal. The legacy PSS/SSS 808 signal can be considered as a special case of discovery signal. If the PSS/SSS 808 is transmitted, then additional discovery subframes may not be required. Instead the existing subframe (shown as subframe 0) can accommodate such a signal. One such example is presented in FIG. 8. Here, the PSS/SSS signal 808 is transmitted in the first subframe (i.e., subframe 0). For example, the UCT can perform an LBT and channel reservation 806 before transitioning to an active state. During the active subframes 810, the PSS/SSS signal 808 is transmitted. After transmission of the active subframes 810, the UCT transitions to a dormant state 812.

In FIG. 9, another embodiment of type 1 UCT frames is shown in which a discovery subframe 914 is periodically transmitted in both dormant subframes 918 and active subframes 916. The transmission of the discovery subframe 914 in this example is not preceded by an LBT or channel reservation mechanism. The UCT transmits the discovery subframe 914 (or signal) whether or not the medium is busy. In another embodiment, the transmission of each discovery subframe 914 can be preceded by an LBT scheme. To aid in LBT, a transmission power of the discovery subframe 914 can be limited, in accordance with a regulatory requirement. For example, the UCT can perform LBT and channel reservation 912 before transitioning to an active state (which may include an alignment gap 922). During the active subframes 916, the discovery subframe 914 is transmitted. This can cause a subframe to become a reduced length subframe 920. After transmission of the active subframes 916, the UCT transitions to a dormant state with dormant subframes 918. A discovery subframe 914 can be sent during the dormant subframe 918 with or without using LBT.

Type 2 UCT

In FIG. 10, an embodiment 1000 of a type 2 UCT is shown in primary eNB 1002 subframes 1006, 1008 and 1010, and UCT secondary eNB 1004 subframes 1016 are not synchronized (or aligned). In this example, the subframe/frame boundary of the UCT secondary eNB 1004 is not aligned with the subframe/frame boundary of the legacy primary eNB 1002. During a dormant state 1018, the UCT refrains from transmission. In order to move to an active state, the UCT performs an LBT and channel reservation mechanism 1012. Since alignment between the primary eNB subframe boundary and secondary eNB subframe boundary is not required for type 2UCT, unlike the type 1 UCT, no alignment gap is defined. Once the medium is reserved, LAA can start transmission. The active subframes 1016 in a type 2 UCT are not aligned with the corresponding primary eNB subframes 1006, 1008 or 1010.

In another embodiment 1100 of a type 2 UCT shown in FIG. 11, a discovery subframe 1114 can be transmitted after an LBT and channel reservation protocol 1112 before the first active subframe in active subframes 1116. For example, the UCT can perform the LBT and channel reservation 1112 and send the discovery subframe 1114 before transitioning to an active state. During the active subframes 1116, data is transmitted (which includes sending and/or receiving). After transmission of the active subframes 1116, the UCT transitions to a dormant state with dormant subframes 1118. The discovery subframe 1114 can be sent during the dormant subframe 1118 with or without using LBT.

Alternatively, a discovery signal similar to PSS/SSS can be transmitted in the first subframe similar to FIG. 8 instead of before the first subframe.

Figure 12:
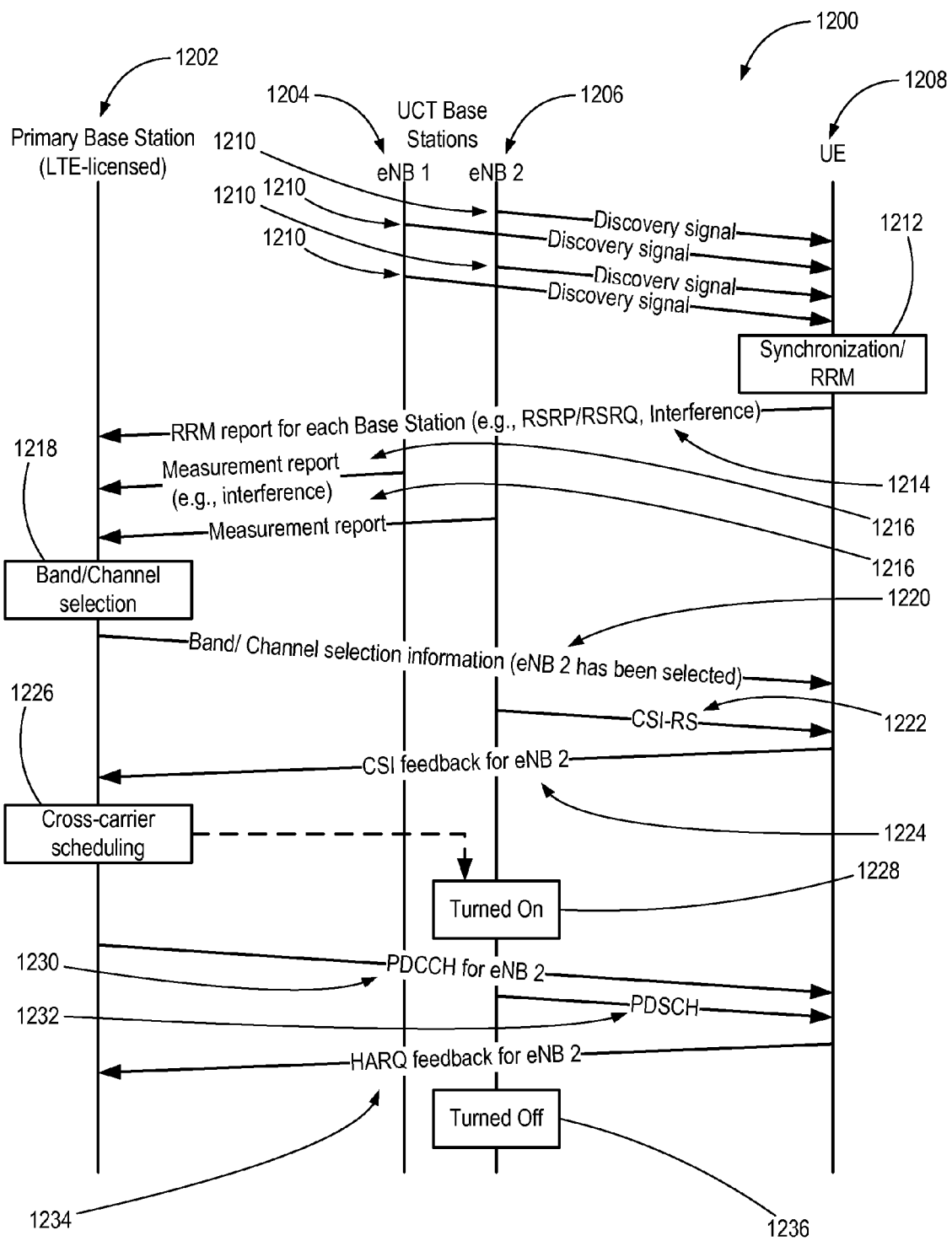
FIG. 12 is a process chart illustrating a method for cross-carrier transmission consistent with embodiments disclosed herein.

FIG. 12 shows an embodiment of a method 1200 of LTE transmissions in an unlicensed band in accordance with the present invention. In this embodiment, LTE-U transmissions can be based on the following operations. It should be noted that some of the operations can be omitted in some deployment scenarios. The method 1200 can be accomplished by a system 100 such as shown in FIG. 1, including primary base station 104, secondary base station 106 and UE 102.

In this embodiment, there are a PCell 1202, two UCT secondary base stations 1204 and 1206, and a UE 1208. However, it should be noted that the system can include more computing resources than shown (e.g., the UE 1208 is one UE of many UEs connected to the primary base station 1202, the UCT secondary base stations 1204 and 1206 are two of many secondary base stations that serve the UEs). Each secondary base station 1204 and 1206 transmits discovery signals 1210 in ON subframes or OFF subframes.

The UE 1208 then optionally reports 1214 the measurement results 1212 to the primary base station 1202, e.g., through a licensed band. The measurement reports 1214 can include RSRP/RSRQ and other interference conditions for each secondary base station 1204 and 1206. Each secondary base station 1204 and 1206 can also optionally measure interference power and report 1216 to the primary base station 1202.

The primary base station 1202 selects one or multiple bands/channels to be used for PDSCH transmissions, e.g., based on the measurement reports from one or multiple UEs and/or from the secondary base stations. The bands/channels selection can be UE-specific, a group of UE-specific, or primary base station-specific. Once one or more bands/channels are selected, the bands/channels selection information can be sent 1220 to the UE(s) 1208 (e.g., through licensed bands using one or multiple of physical broadcast channel (PBCH), physical downlink control channel (PDCCH), enhanced physical downlink control channel (ePDCCH), and PDSCH).

The selected secondary base station may transmit reference signals 1222 (such as CSI-RS) that can be used for CSI feedback by UE 1208. The CSI-RS transmission can be preceded by an LBT or can be simply transmitted using a predetermined set of resources. Then, UE 1208 reports 1224 to the primary base station 1202 CSI (e.g., rank indicator (RI), precoding matrix indicator (PMI), and channel quality indicators (CQIs)) for all or a part of the selected secondary base station(s) 1204 and 1206 (in this case, it is secondary base station 2 (1206)). In an embodiment, the CSI can be measured based on the discovery signals 1210.

The primary base station 1202 schedules 1226 PDSCH transmission of each selected secondary base station 1206 based on the measurement reports and CSI reports from the UE 1208 (often multiple UEs at once). The scheduling for each secondary base station 1204 and 1206 may include decision on Tx power, target UE, amount of resources (i.e., number of RBs), data rate (modulation and coding scheme), rank, precoding matrix, etc. The secondary base station 1204 and 1206 scheduling by the primary base station 1202 is referred to as cross-carrier scheduling.

When a particular subframe of an secondary base station 1206 is scheduled (i.e., the secondary base station 1206 transmits one or more PDSCHs in the particular subframe), the secondary base station 1206 transitions 1228 from an OFF state to an ON state (i.e., the secondary base station 1206 is turned on) and transmits a PDSCH(s) 1232. At the same subframe (or at a predefined time instance), the primary base station 1202 transmits a PDCCH(s) 1230 to each target UE (such as the UE 1208) that conveys at least UE identification, secondary base station identification (indicating which secondary base station 1206 transmits the PDSCH 1232 and other information needed for PDCSH decoding). Each PDCCH 1230 transmitted by the primary base station 1202 is associated with the PDSCH 1232 transmitted by the secondary base station 1206. The PDSCH 1232 transmitted by the secondary base station 1206 can be preceded by an LBT (and/or a channel reservation).

After transmission of the PDSCH 1232 to the UE 1208, the UE 1208 can report the PDSCH 1232 transmission to the primary base station 1202 through a hybrid automatic repeat request (HARD) report 1234. If no more data is scheduled, then the secondary base station 1206 can turn off 1236).

If the secondary base station 1204 is not scheduled, i.e., no PDSCH is transmitted, the secondary base station 1204 stays in an OFF state (or transitions from an ON state to an OFF state). The transition between ON/OFF states within the UCT secondary base station 1204 can be on a subframe basis or on a group of subframes basis.

A discovery signal can be one or a combination of various signals in LTE (e.g., PSS, SSS, CRS, CSI-RS, etc.), which may include modifications to these signals. The discovery signal transmissions 1210 can be periodic or aperiodic. In case of being aperiodic, the discovery signal transmission 1210 can be preceded by an LBT scheme which may include the channel reservation for the discovery signal transmission 1210. In another embodiment, the discovery signals 1210 can be transmitted without sensing the channel, i.e., they can be transmitted regardless of ongoing transmissions of other RATs or LTE-U transmissions by other operators. The UE 1208 can obtain at least coarse frequency/time synchronization using the discovery signals 1210 (or subframes). The UE 1208 can use the discovery signals 1210 to measure the quality of UCT signals such as RSRP/RSRQ. The UE 1208 can also measure interference power using the discovery signal 1210 (or other schemes, e.g., total received power).

Principles of the above embodiment can also be applied to support opportunistic networking of high frequency (e.g., mmWave) communication with the following four operations.

(1) A UCT transmits discovery signals (or discovery subframes or synchronization) on the mmWave spectrum. The discovery signal transmissions can be periodic or aperiodic. In case of aperiodic transmissions of discovery signals, a UE can obtain at least coarse frequency/time synchronization using the discover signals (or subframes). The UE can optionally use the discovery signals to measure the quality of UCT signals such as RSRP/RSRQ. The UE can also measure interference power using the discovery signals (or other schemes such as total received power, etc.).

(2) A UE then reports measurements to the primary base station (e.g., through a licensed band). The measurement report can include RSRP/RSRQ and other interference conditions.

(3) The primary base station selects one or multiple bands/channels to be used for PDSCH transmissions (e.g., based on the measurement reports from one or multiple UEs or other information related to the mmWave beam forming). If channel conditions are favorable, one or more bands/channels can be selected for opportunistic data transmission in the mmWave spectrum.

(4) The primary base station turns on the secondary base station and schedules PDSCH transmissions on the secondary base station UCT to one or multiple UEs (e.g., via cross-carrier scheduling). The scheduling may also be done in the secondary base station (self-scheduling or non-cross-carrier scheduling). In one embodiment, the scheduling is only done in the secondary base station if the control channel or scheduling can be transmitted reliably in the secondary base station.

While UEs, primary base stations, secondary base stations and other systems have been discussed in the singular for ease of understanding, it should be recognized that embodiments may include multiples of these systems and operate in parallel fashion (such as scheduling multiple UEs for transmission timing).

Figure 13:
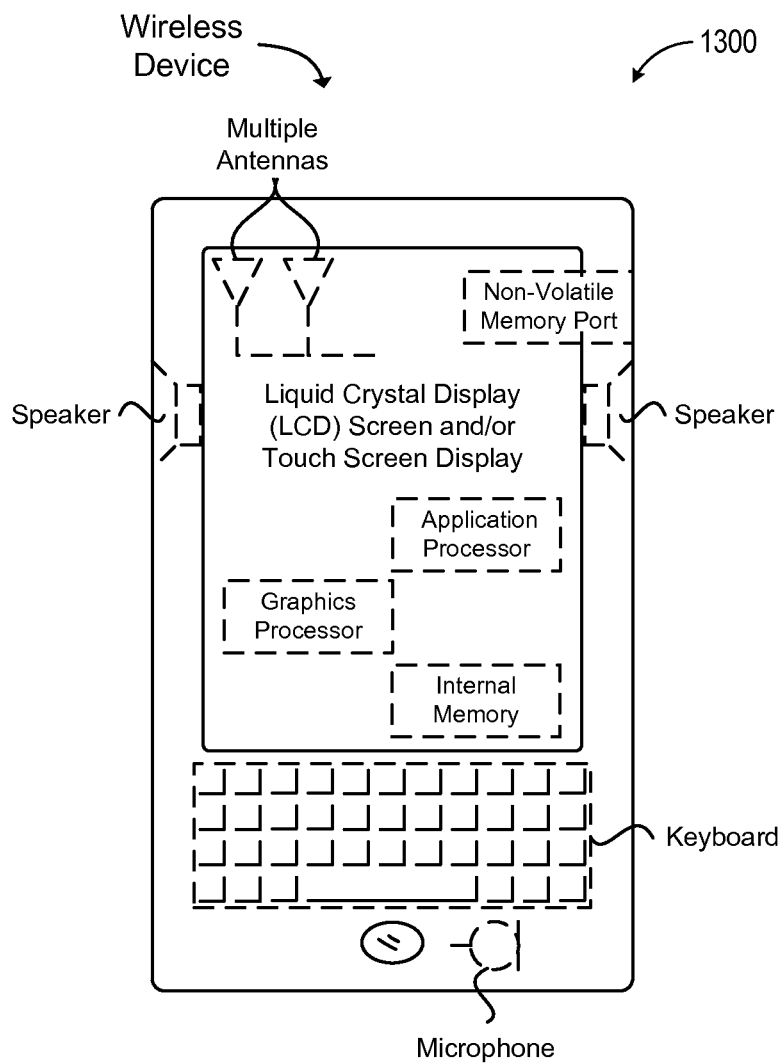
FIG. 13 is a schematic diagram of a computing system consistent with embodiments disclosed herein.

FIG. 13 is an example illustration of a mobile device, such as a UE, a mobile station (MS), a mobile wireless device, a mobile communication device, a tablet, a handset, or another type of mobile wireless device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, HSPA, Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 13 also provides an illustration of a microphone and one or more speakers that can be used for audio input and output from the mobile device. The display screen can be a liquid crystal display (LCD) screen or other type of display screen, such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the mobile device. A keyboard can be integrated with the mobile device or wirelessly connected to the mobile device to provide additional user input. A virtual keyboard can also be provided using the touch screen.

Many of the systems described include computing resources and systems. A computing system can be viewed as an information passing bus that connects various components. A computing system includes a processor having logic for processing instructions. Instructions can be stored in and/or retrieved from memory and a storage device that includes a computer-readable storage medium. Instructions and/or data can arrive from a network interface that can include wired or wireless capabilities. Instructions and/or data can also come from an I/O interface that can include such things as expansion cards, secondary buses (e.g., USB, etc.), devices, etc. A user can interact with the computing system through user interface devices and a rendering system that allows the computer to receive and provide feedback to the user.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

EXAMPLES

The following examples pertain to further embodiments.

Example 1 is a primary base station for cross-carrier scheduling that is configured to select a secondary base station for cross-carrier scheduling for communication with a mobile device over a set of frequencies shared with another radio access technology (RAT). The primary base station is further configured to send a request for cross-carrier scheduling to the secondary base station. The primary base station is also configured to provide the secondary base station with a schedule for transmitting data to a mobile device. The primary base station is further configured to cause the secondary base station to transmit the data in a portion of a second frame that aligns with a first frame of the primary base station.

In Example 2, the primary base station of Example 1 can optionally be configured to receive a transmission quality report from user equipment (UE) that describes transmission quality measurements between the UE and the secondary base station.

In Example 3, the primary base station of Examples 1-2 can optionally be configured to receive a transmission quality report from the secondary base station that describes transmission quality measurements between the secondary base station and a user equipment (UE).

In Example 4, the primary base stations in Example 1-3 can optionally be configured to receive a report indicating receipt of the data by a user equipment (UE) from the secondary base station.

In Example 5, the report of Example 4 can optionally be a hybrid automatic repeat request (HARD) message.

Example 6 is an enhanced node B (eNB) for cross-carrier transmission comprising a first network interface, a second network interface and a processor. The first network interface is configured for communicating with a user equipment (UE) over a first set of wireless spectrum. The second network interface configured for communicating with network infrastructure that includes an unconventional carrier type (UCT). The processor is configured to receive a report from the UE including a measurement of a UCT discovery signal sent from the UCT over a second set of wireless spectrum. The processor is further configured to select the UCT for transmission of data to the UE and schedule transmission of the data over the UCT.

In Example 7, the UCT of Example 6 can optionally provide the physical downlink control channel (PDCCH) to the UE.

In Example 8, the eNB of Example 6 can optionally provide the physical downlink control channel (PDCCH) to the UE.

In Example 9, the eNB of Examples 6-8 can optionally include receiving the report from the UE including the measurement of a periodic UCT discovery signal from the UCT.

In Example 10, the UE of Examples 6-8 can optionally be configured to receive the report from the UE including the measurement of an aperiodic UCT discovery signal from the UCT.

Example 11 is a method of transmitting data comprising providing a primary medium of communication with a user equipment (UE) using a first band of frequencies. The method can further include receiving a report describing transmission quality of a secondary base station with the UE over a secondary medium using a second band of frequencies shared with at least one radio access technology (RAT). The method can also further include selecting the secondary base station for use in cross-carrier transmission with the UE. The method can also include reserving the secondary medium for communication with the UE. The method can further include scheduling a set of data for transmission over the secondary medium by the secondary base station to the UE. The method can include causing at least a subset of the set of data to be transmitted over the secondary medium using a third generation partnership project (3GPP) compatible protocol.

In Example 12, the method of Example 11 can optionally include performing a listen before talk protocol.

In Example 13, the method of Examples 11-12 can optionally use an unlicensed set of frequencies as the secondary medium.

In Example 14, the method of Examples 11-12 can optionally use an unlicensed set of frequencies as the secondary medium.

In Example 15, the method of Example 14 can optionally include transmitting a control channel scheduling the set of data over the primary medium.

In Example 16, the method of Examples 11 can optionally include performing a listen before talk protocol; transmitting a control channel scheduling the set of data over the primary medium; transmitting a channel reservation signal over the secondary medium to reserve the secondary medium; transmitting the subset of the set of data asynchronously over the secondary medium as compared with the primary medium; aligning subframes of the secondary medium with subframes of the primary medium; using an unlicensed set of frequencies as the secondary medium; or using a licensed set of frequencies as the secondary medium.

In Example 17, the method of Example 11 can optionally include aligning subframes of the secondary medium with subframes of the primary medium.

In Example 18, the method of Example 17 can optionally transmitting a channel reservation signal over the secondary medium to reserve the secondary medium.

In Example 19, the method of Example 18 further includes forming an alignment gap between the channel reservation signal sent over the secondary medium and an aligned subframe of the secondary medium.

In Example 20, the method of Example 19 can optionally include transmitting at least a portion of a wireless local area network (WLAN) preamble during at least a portion of the alignment gap.

In Example 21, the method of Example 19 can optionally include transmitting at least a noise signal during at least a portion of the alignment gap.

In Example 22, the method of Examples 19 is optionally transmitting at least a portion of a discovery signal during at least a portion of the alignment gap.

In Example 23, the method of Examples 19 can optionally determining that a duration of the alignment gap is less than a threshold amount and refraining from transmission during the alignment gap.

In Example 24, the method of Example 19 can optionally include one or more of transmitting at least a portion of a wireless local area network (WLAN) preamble during at least a portion of the alignment gap; transmitting at least a noise signal during at least a portion of the alignment gap; transmitting at least a portion of a discovery signal during at least a portion of the alignment gap; or determining that a duration of the alignment gap is less than a threshold amount and refraining from transmission during the alignment gap.

In Example 25, the method of Example 17 can include forming a super subframe that includes an alignment gap.

In Example 26, the method of Example 17 can optionally include forming a reduced length subframe for transmission over the secondary medium.

In Example 27, the method of Example 11 can optionally transmitting the subset of the set of data asynchronously over the secondary medium as compared with the primary medium.

Example 28 is an comprising means to perform a method as described in any of Examples 11-27.

Example 29 is machine readable storage including machine-readable instructions that when executed implement a method or realize an apparatus as exemplified in any of Examples 11-27.

The invention claimed is:

1. A primary base station for cross-carrier scheduling configured to:
   select a secondary base station for cross-carrier scheduling for communication with a mobile device over a set of frequencies shared with another radio access technology (RAT);
   send a request for cross-carrier scheduling to the secondary base station;
   provide the secondary base station with a schedule for transmitting data to a mobile device; and
   cause the secondary base station to transmit the data in a portion of a second frame that aligns with a first frame of the primary base station by forming a first-transmitted super subframe using an alignment gap and additional symbols.

2. The primary base station of claim 1, wherein the primary base station is further configured to receive a transmission quality report from user equipment (UE) that describes transmission quality measurements between the UE and the secondary base station.

3. The primary base station of claim 1, wherein the primary base station is further configured to receive a transmission quality report from the secondary base station that describes transmission quality measurements between the secondary base station and a user equipment (UE).

4. The primary base station of claim 1, wherein the primary base station is further configured to receive a report indicating receipt of the data by a user equipment (UE) from the secondary base station.

5. The primary base station of claim 4, wherein the report is a hybrid automatic repeat request (HARQ) message.

6. An enhanced node B (eNB) for cross-carrier transmission comprising:
   a first network interface configured for communicating with a user equipment (UE) over a first set of wireless spectrum;
   a second network interface configured for communicating with network infrastructure that includes an unconventional carrier type (UCT);
   a processor configured to:
      receive a report from the UE including a measurement of a UCT discovery signal sent from the UCT over a second set of wireless spectrum;
      select the UCT for transmission of data to the UE; and
      schedule transmission of the data over the UCT and aligning subframes of the secondary second set of wireless spectrum with subframes of the first set of wireless spectrum by forming a first-transmitted reduced length subframe with fewer symbols and a discovery subframe comprising the UCT discovery signal.

7. The eNB of claim 6, wherein the UCT provides the physical downlink control channel (PDCCH) to the UE.

8. The eNB of claim 6, wherein the eNB provides the physical downlink control channel (PDCCH) to the UE.

9. The eNB of claim 6, wherein to receive the report from the UE including the measurement of the UCT discovery signal from the UCT further comprises receiving the report from the UE including the measurement of a periodic UCT discovery signal from the UCT.

10. The eNB of claim 6, wherein to receive the report from the UE including the measurement of the UCT discovery signal from the UCT further comprises receiving the report from the UE including the measurement of an aperiodic UCT discovery signal from the UCT.

11. A method of transmitting data comprising:
   providing a primary medium of communication with a user equipment (UE) using a first band of frequencies;
   receiving a report describing transmission quality of a secondary base station with the UE over a secondary medium using a second band of frequencies shared with at least one radio access technology (RAT);
   selecting the secondary base station for use in cross-carrier transmission with the UE;
   reserving the secondary medium for communication with the UE by transmitting a channel reservation signal over the secondary medium to reserve the secondary medium;
   scheduling a set of data for transmission over the secondary medium by the secondary base station to the UE; and
   causing at least a subset of the set of data to be transmitted over the secondary medium using a third generation partnership project (3GPP) compatible protocol and aligning subframes of the secondary medium with subframes of the primary medium by forming an alignment gap between the channel reservation signal sent over the secondary medium and an aligned subframe of the secondary medium.

12. The method of claim 11, wherein the method further comprises performing a listen before talk protocol.

13. The method of claim 11, wherein the secondary medium comprises an unlicensed set of frequencies.

14. The method of claim 11, wherein the secondary medium comprises a licensed set of frequencies.

15. The method of claim 11, wherein causing at least a subset of the set of data to be transmitted over the secondary medium further comprises transmitting a control channel scheduling the set of data over the primary medium.

16. The method of claim 11, wherein causing at least a subset of the set of data to be transmitted over the secondary medium further comprises aligning subframes of the secondary medium with subframes of the primary medium.

17. The method of claim 16, wherein reserving the secondary medium further comprises transmitting a channel reservation signal over the secondary medium to reserve the secondary medium.

18. The method of claim 17, wherein aligning the subframes of the secondary medium with the subframes of the primary medium further comprises forming an alignment gap between the channel reservation signal sent over the secondary medium and an aligned subframe of the secondary medium.

19. The method of claim 18, further comprising transmitting at least a portion of a wireless local area network (WLAN) preamble during at least a portion of the alignment gap.

20. The method of claim 18, further comprising transmitting at least a noise signal during at least a portion of the alignment gap.

21. The method of claim 18, further comprising transmitting at least a portion of a discovery signal during at least a portion of the alignment gap.

22. The method of claim 18, further comprising:
determining that a duration of the alignment gap is less than a threshold amount;
refraining from transmission during the alignment gap.

23. The method of claim 16, wherein aligning the subframes of the secondary medium with the subframes of the primary medium further comprises forming a super subframe that includes an alignment gap.

24. The method of claim 16, wherein aligning the subframes of the secondary medium with the subframes of the primary medium further comprises forming a reduced length subframe for transmission over the secondary medium.

25. The method of claim 11, wherein causing at least a subset of the set of data to be transmitted over the secondary medium further comprises transmitting the subset of the set of data asynchronously over the secondary medium as compared with the primary medium.

* * * * *